T. POOL.
Clothes-Wringers.
No. 5,330. Reissued March 18, 1873.
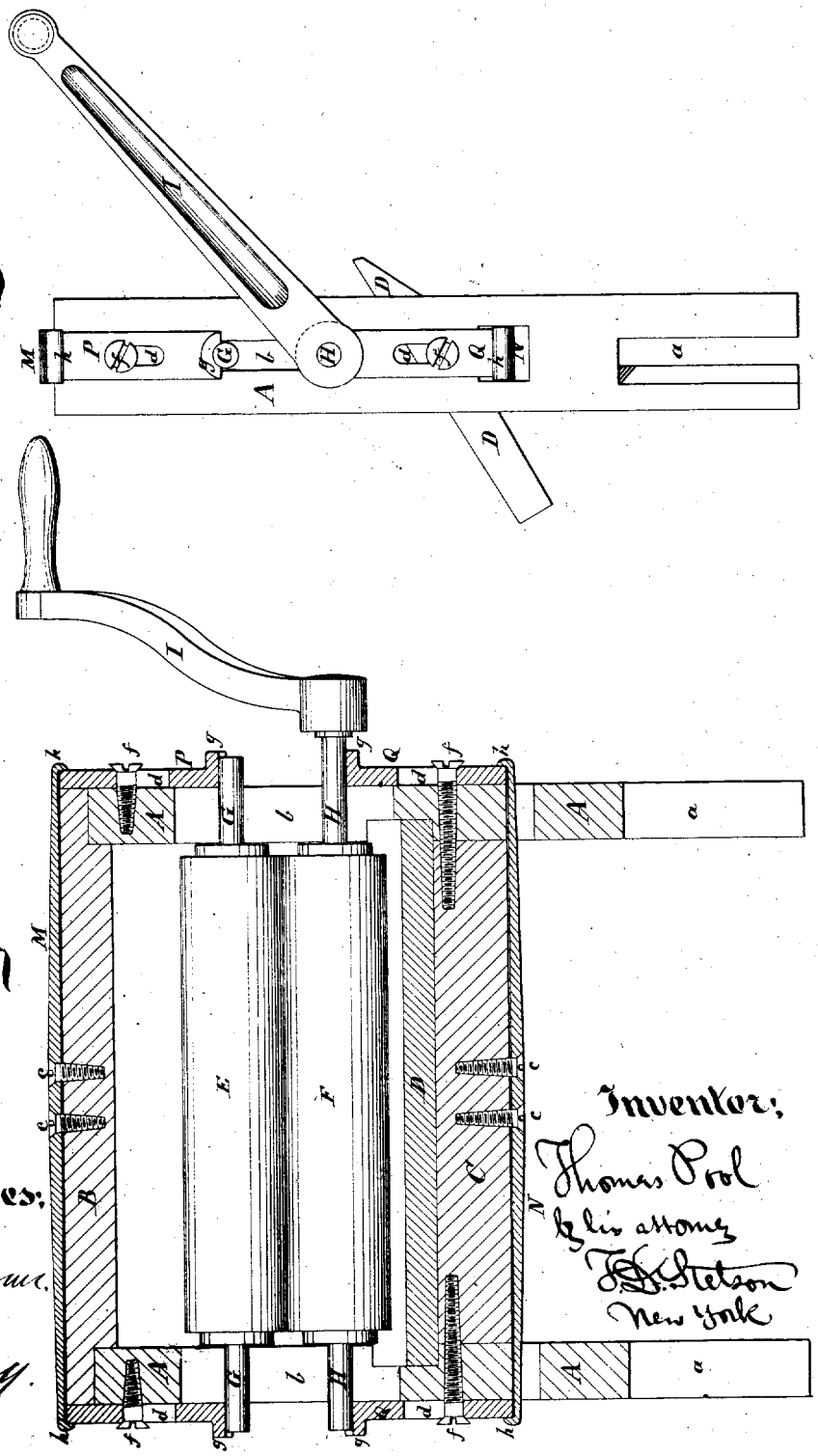
Witnesses:
A. Hornamer.
W. C. Dey.
Inventor:
Thomas Pool
by his attorney
T. D. Stetson
New York

UNITED STATES PATENT OFFICE.

THOMAS POOL, OF BRUNSWICK, OHIO, ASSIGNOR TO METROPOLITAN WASHING-MACHINE COMPANY.

IMPROVEMENT IN CLOTHES-WRINGERS.

Specification forming part of Letters Patent No. 55,705, dated June 24, 1862; reissue No. 5,330, dated March 18, 1873.

*To all whom it may concern:*

Be it known that I, THOMAS POOL, of Brunswick, in the county of Medina and State of Ohio, have invented a new and useful Improvement in Clothes-Wringers; and I do hereby declare that the following is a full and exact description of what I consider the best means of carrying out the same, reference being had to the accompanying drawing making part of this specification—

Figure 1 being a central longitudinal vertical section of the clothes-wringer; Fig. 2, a side elevation thereof.

Like letters designate corresponding parts in both figures.

My invention applies to clothes-wringers, in which two pressure-rollers, generally made of India rubber, are mounted in a suitable framing; and relates to means for securing the proper elastic separation and closing of the rollers, and for guiding the bearings thereof.

I employ a simple wooden frame, composed of the upright pieces A A, cross-piece B at the top and another cross-piece, C, toward the bottom, of suitable dimensions and of any convenient construction. The uprights or posts A A are suitably provided with notches *a a*, or their equivalents, for attaching to a tub or other support. An inclined board, D, is situated beneath the position of the rollers and over the lower cross-piece C, all substantially as represented in the drawing. The rollers E F, of India rubber, or equivalent material, are secured in the ordinary manner to shafts G H, one of which projects from the frame, and is provided with a winch or crank for turning the rollers. The journals of the shafts play vertically in slots *b b* in the side frame-pieces A A, both having thus a free movement up and down, sufficient to allow the rollers to separate as far as ever required. Instead of allowing only one of these rollers to yield to accommodate the different sizes of articles to be wrung, I cause both to yield equally and simultaneously, substantially as follows:

I employ two springs, M N, generally straight, and as long as practicable, and in fact reaching the whole width of the frame, and projecting a little at each end. One of them is located on the top of the upper cross-piece B of the frame, and the other is secured to the under side of the lower cross-piece C, the exact location, however, not being essential. They are respectively attached to the cross-piece at the middle by screws *c c*, or their equivalents. These springs are of equal, or nearly equal, strength, and at both ends alike, so that the yielding will be equal at both ends, and downward as well as upward. They are as long as practicable, so as to get as little variation of force in their movement as possible, and this result is enhanced by the employment of the two springs, thereby getting a greater extent of spring-movement with the same variation of elastic pressure. The pressure is communicated from the springs to the journals of the roller-shafts G H by means of sliding bearings P P and Q Q arranged in a peculiar manner. They are held in place by a vertical slot in each, which plays respectively over a screw, *f*, or its equivalent, passing through the same into the frame of the machine. One end of each bearing simply abuts against the projecting end of one of the springs M N, which is generally bent over the same, as shown, and the other end of each bearing is hollowed at *g*, so as to fit against, and partly around, the shafts G H respectively. These concave surfaces thus not only furnish bearings for the roller-shafts, but, on the other hand, the shafts keep the bearings in place, preventing them from turning round out of position.

This construction of the machine is exceedingly simple in all its parts, the wood parts being plane pieces, and the metal portions being either simple castings or of such plane and round forms as to be quickly and easily made and put together; hence the great objects aimed at, cheapness and simplicity of construction, durability, and efficiency of action, are gained.

What I claim as my invention, and desire to secure by Letters Patent, is—

1. The combination of two pressure-rollers with a slotted supporting-frame, in which the axes of both rollers are free to move toward and from each other, and with yielding bearings acted on by springs to allow the movement of both rollers, and thereby increase the elastic action, substantially as herein specified.

2. In connection with the above, giving an equal, or nearly equal, elastic action to each roller by means of the long springs M N, made exact counterparts of each other, and arranged substantially as and for the purposes herein set forth.

3. The combination and arrangement of the spring or springs M N, sliding bearing-blocks P P Q Q, having guide slots and bearings *d d g g*, and the stationary guide-screws or pins *f f* applied to the rollers, substantially as and for the purposes herein specified.

In testimony whereof I have hereunto set my hand this 11th day of January, 1873.

THOMAS POOL.

Witnesses:
F. M. CHANDLER,
J. A. CHANDLER.